(12) United States Patent
Felgenhauer

(10) Patent No.: US 8,166,666 B2
(45) Date of Patent: May 1, 2012

(54) COMPACT GAS DRYER AND METHOD FOR MANUFACTURING THE SAME

(75) Inventor: Björn Felgenhauer, Sarstedt (DE)

(73) Assignee: Swep International AB, Landskrona (SE)

( * ) Notice: Subject to any disclaimer, the term of this patent is extended or adjusted under 35 U.S.C. 154(b) by 1094 days.

(21) Appl. No.: 11/989,010

(22) PCT Filed: Jun. 26, 2006

(86) PCT No.: PCT/SE2006/050217
§ 371 (c)(1),
(2), (4) Date: Mar. 3, 2008

(87) PCT Pub. No.: WO2007/011297
PCT Pub. Date: Jan. 25, 2007

(65) Prior Publication Data
US 2009/0120609 A1    May 14, 2009

(30) Foreign Application Priority Data
Jul. 22, 2005  (SE) ....................... 0501720

(51) Int. Cl.
*F26B 19/00* (2006.01)
(52) U.S. Cl. .............. 34/90; 34/182; 34/242; 165/61; 165/166; 29/890.03
(58) Field of Classification Search ............ 34/60, 86, 34/90, 72, 187, 210, 218, 242; 165/61, 166; 29/890.03; 95/93, 99
See application file for complete search history.

(56) References Cited

U.S. PATENT DOCUMENTS

| | | | | |
|---|---|---|---|---|
| 2,674,338 A | * | 4/1954 | Lindsay et al. | ............ 423/239.1 |
| 3,152,872 A | * | 10/1964 | Scoggin et al. | ................. 34/407 |
| 3,488,677 A | * | 1/1970 | Tracy et al. | ..................... 62/618 |
| 3,797,565 A | | 3/1974 | Fernandes | |
| 3,887,339 A | * | 6/1975 | Robertson | ......................... 95/11 |
| 4,314,891 A | * | 2/1982 | Knobel | ........................... 203/18 |
| 4,484,451 A | * | 11/1984 | Darm | ................................ 62/90 |
| 4,905,476 A | * | 3/1990 | Cinacchi | ........................... 62/93 |
| 5,016,361 A | * | 5/1991 | Durr | ............................... 34/370 |

(Continued)

FOREIGN PATENT DOCUMENTS
CN  1163389 A  10/1997
(Continued)

OTHER PUBLICATIONS
Letter dated Aug. 18, 2011 from Australian Patent Office including the examination report.

*Primary Examiner* — Stephen M. Gravini
(74) *Attorney, Agent, or Firm* — Merchant & Gould P.C.

(57) ABSTRACT

A compact gas dryer (100) comprises a primary heat exchanger (200) exchanging heat between hot, incoming, contaminated gaseous medium and outgoing dry, cool gaseous 5 medium, a secondary heat exchanger (300) exchanging heat between incoming cold gaseous medium from the primary heat exchanger (200) and a refrigerant, and a condense trap (400) trapping condensable matter in the cooled gaseous medium exiting the secondary heat exchanger (300). 10 Afterwards, the dry, cool gaseous medium exchanges heat with the incoming contaminated gaseous medium in the primary heat exchanger. The primary heat exchanger (200), the secondary heat exchanger (300) and the condense trap (400) are combined into a single unit (100).

9 Claims, 4 Drawing Sheets

U.S. PATENT DOCUMENTS

| | | | |
|---|---|---|---|
| 5,231,772 A * | 8/1993 | Hermanns et al. | 34/497 |
| 5,302,254 A * | 4/1994 | Martin et al. | 201/21 |
| 5,727,623 A | 3/1998 | Yoshioka et al. | |
| 5,832,736 A | 11/1998 | Yoshioka et al. | |
| 6,085,529 A | 7/2000 | Galus et al. | |
| 7,044,206 B2 | 5/2006 | Sabin et al. | |
| 2003/0000228 A1 * | 1/2003 | Leuenberger et al. | 62/64 |
| 2004/0069837 A1 * | 4/2004 | Fujiyama et al. | 228/183 |
| 2004/0206095 A1 | 10/2004 | Feisthauer | |
| 2008/0060217 A1 * | 3/2008 | Swoboda et al. | 34/446 |
| 2009/0120609 A1 * | 5/2009 | Felgenhauer | 165/61 |
| 2010/0224061 A1 * | 9/2010 | Grover | 95/93 |

FOREIGN PATENT DOCUMENTS

| | | |
|---|---|---|
| EP | 1 426 722 | 6/2004 |
| WO | WO 88/01722 | 3/1988 |
| WO | WO 2004/070302 A1 | 1/2004 |
| WO | WO 2005009669 A1 * | 2/2005 |
| WO | WO 2007011297 A1 * | 1/2007 |

* cited by examiner

COMPACT GAS DRYER AND METHOD FOR MANUFACTURING THE SAME

FIELD OF THE INVENTION

The present invention relates to a compact gas dryer, comprising a primary heat exchanger exchanging heat between hot, incoming, contaminated gaseous medium and outgoing dry, cool gaseous medium, a secondary heat exchanger exchanging heat between incoming cold gaseous medium from the primary heat exchanger and a refrigerant, and a condense trap trapping condensable matter in the cooled gaseous medium exiting the secondary heat exchanger, after which the dry, cool gaseous medium exchanges heat with the incoming contaminated gaseous medium in the primary heat exchanger.

The present invention further relates to a method for manufacturing a compact gas dryer.

PRIOR ART

As is well known by persons e.g. skilled in the art of compressed air, it is often necessary to dry and clean the compressed air before it is used. Heretofore, this has often been accomplished by cooling the compressed air, hence condensing condensable matter in the air; the condensed matter is then separated from the air, after which the air is reheated, in order to avoid condensation on the exterior of piping transporting the air and to avoid icing as the compressed air expands upon use.

A system typical for the state of the art is presented in U.S. Pat. No. 5,794,453. Here, the compressed air is entering a primary cooler 16', where it is cooled down in order to allow the contaminated in the air to condense. The air is then forwarded to a condense trap 18', where the condensed contaminated is separated from the air. Finally, the air is forwarded to a second heat exchanger 42, where the air is heated. The system presented in U.S. Pat. No. 5,794,453 differs from the state of the art in an unusual solution for the refrigerant circuitry; instead of exchanging heat between the incoming (hot) air and the outgoing (cold) air, some of the refrigerant condensation takes place in a the heat exchanger 42 (which, as mentioned, serves to heat the outgoing air).

In the patent literature, there are several different solutions for drying compressed air, see e.g. GB-A-2 353 229, U.S. Pat. No. 4,638,852, U.S. Pat. No. 5,107,919, U.S. Pat. No. 3,722,583 and WO-A-01/17665.

All these solutions have one thing in common; they are all made up from discrete components, that are interconnected by piping. This makes the systems bulky and cost inefficient.

SUMMARY OF THE INVENTION

The present invention solves the above and other problems by a combining a primary heat exchanger, a secondary heat exchanger and a condense trap into a single unit.

The present invention also solves the above problems by a manufacturing method comprising the steps of:

i. stacking a number of heat exchanger plates into a first stack forming a primary heat exchanger;

ii. onto said first stack, stacking components to form a condense trap;

iii. onto the components forming the condense trap, stacking heat exchanger plates into a second stack forming a secondary heat exchanger;

iv. placing the stack of heat exchanger plates and condense trap components, in a brazing oven and brazing the stack into a single component air dryer.

In order to simplify the manufacturing process, it is advantageous if the single component air dryer is brazed in one piece.

In order to minimize heat transfer between the primary and secondary heat exchangers, it is beneficial if the condense trap is placed between the primary and secondary heat exchangers.

From an economical standpoint, the primary and secondary heat exchangers could be manufactured from a number of identical heat exchanger plates.

To avoid oxidation and rusting, the heat exchanger plates are preferably made from stainless steel.

BRIEF DESCRIPTION OF THE DRAWINGS

Hereinafter, the present invention will be described with reference to the appended drawings, wherein.

DESCRIPTION OF PREFERRED EMBODIMENTS

In the following description, the device according to the invention is referred to as an air dryer. It will however be evident for a person skilled in the art that the device according to the invention could be used to separate any condensable matter from any gaseous medium having a higher condensation temperature.

Figure 1:
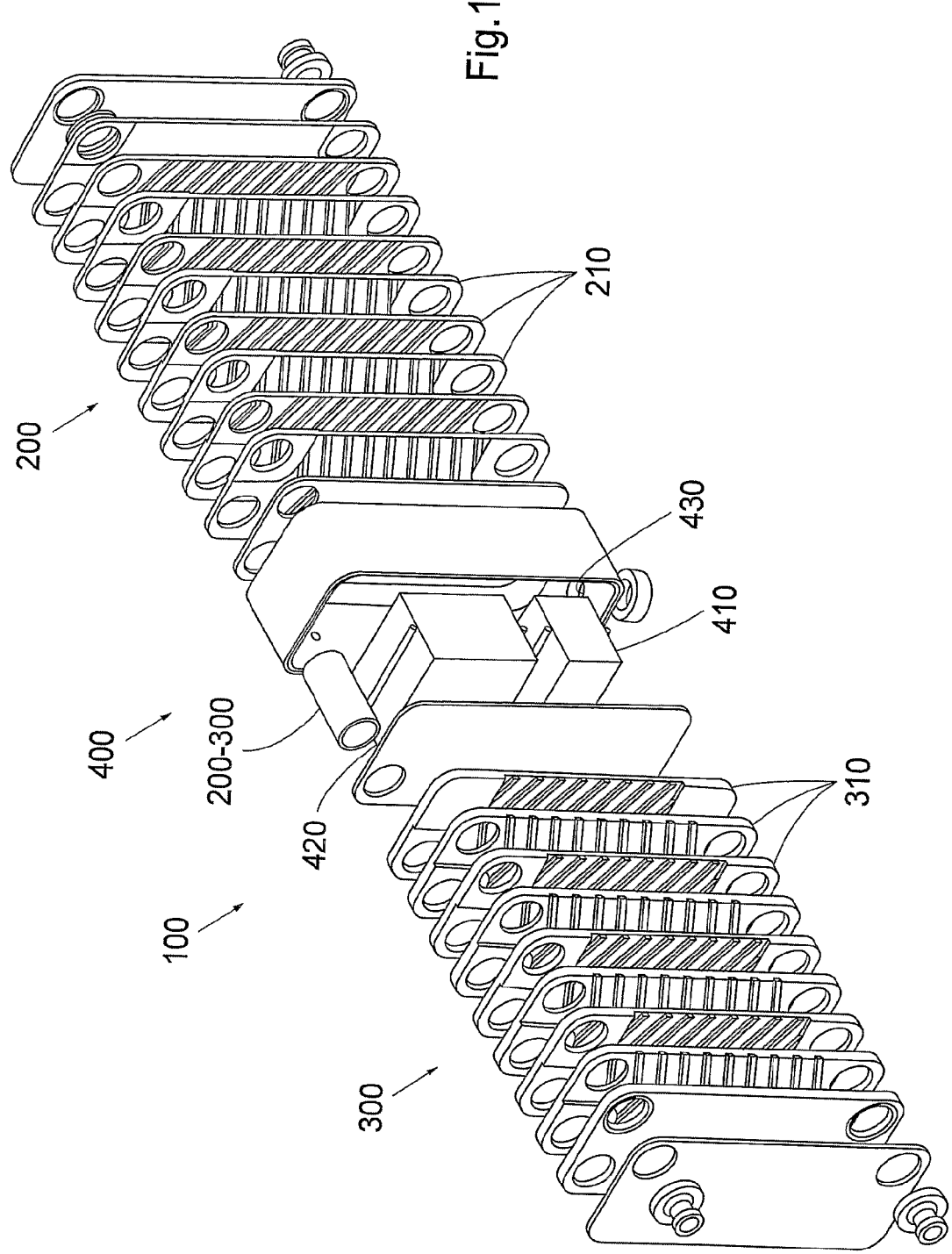
FIG. 1 is an exploded perspective view showing an air dryer according to the present invention.

In FIG. 1, an air dryer 100, comprising a primary heat exchanger 200, a secondary heat exchanger 300, and a condense trap 400 is shown in an exploded perspective view. As can be seen, the primary and secondary heat exchangers 200 and 300, respectively, comprise a number of heat exchanger plates 210 and 310, respectively. The number of heat exchanger plates can be varied depending on the required heat exchanger capacity, but a preferred number of heat exchanger plates can be from e.g. 4 plates to 200 plates, preferably 8 to 100 plates. Interposed between all plates are sheets (not shown) of a brazing material, e.g. copper or nickel.

The condense trap 400 comprises a trapping medium. In the show embodiment, two different trapping media are used; a primary medium 410 and a secondary medium 420. The primary and secondary media could e.g. be composed of wire meshes.

In the following, the function of the air dryer will be more fully explained. The explanation is based on the path of an air atom travelling through the air dryer; hence, the first heat exchanger an incoming air atom encounters is referred to as the "primary heat exchanger", although this heat exchanger also is the last heat exchanger the same air atom passes before it leaves the air dryer.

The primary heat exchanger 200 has an inlet 220 (see FIG. 2) for letting in hot, contaminated air. The contamination is preferably a condensable contamination; for non-condensable matter, the present air dryer has little or no effect. The hot, contaminated air is cooled down by exchanging heat with outgoing cold, dry air. After passing through the primary heat exchanger, the air is forwarded through an internal pipe 200-300 to the secondary heat exchanger 300, in which the temperature of the air is lowered by a heat exchange with a refrigerant. The lowered temperature condenses condensable matter, e.g. water or hydrocarbons. From the secondary heat exchanger 300, the air flows to the condense trap 400, where the condensed matter is separated from the air stream and let out from the system through a drainage hole 430.

After passing through the condense trap, the cold and dry air passes the primary heat exchanger once again, to exchange heat with the incoming hot contaminated air.

Figure 2:
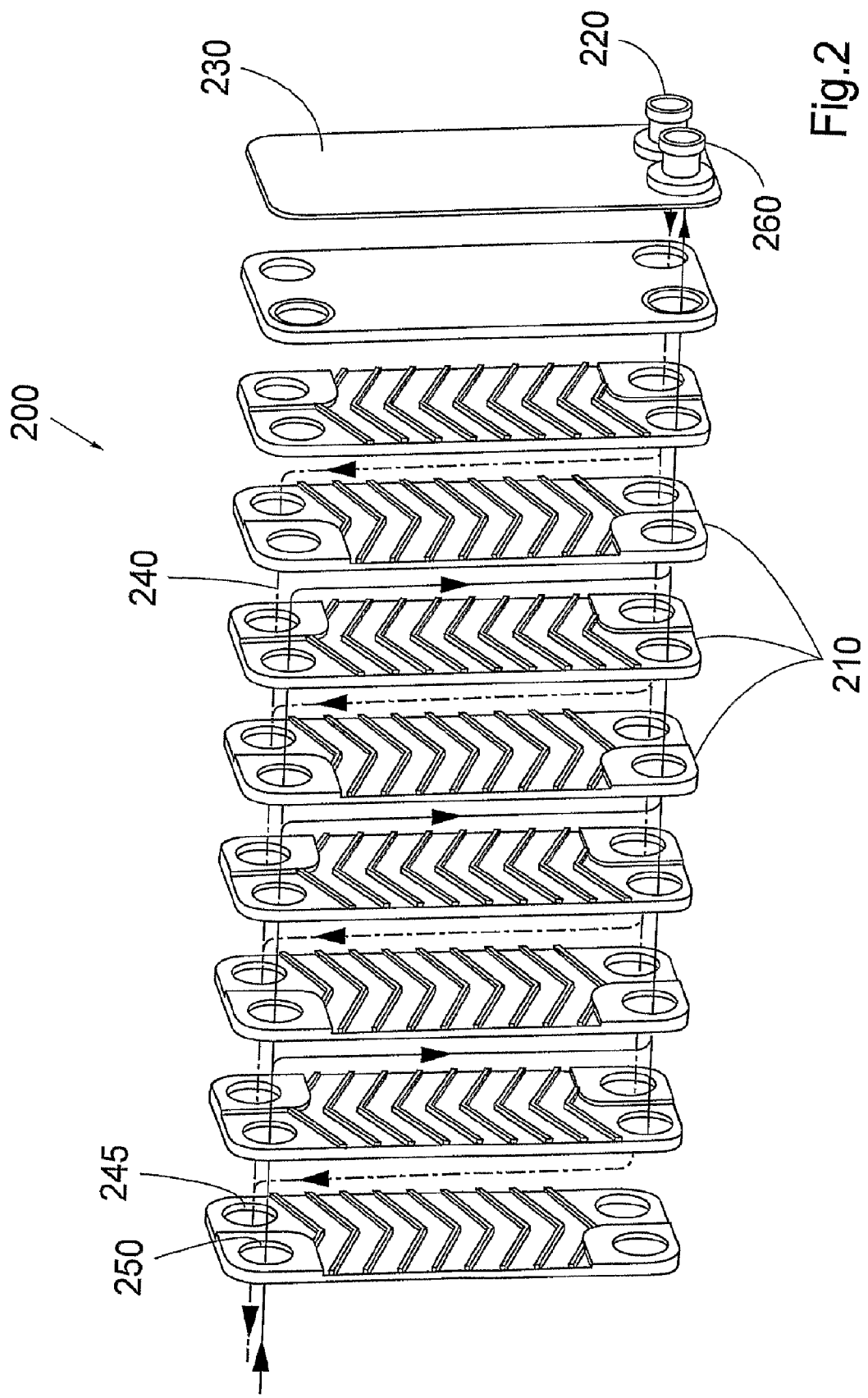
FIG. 2 is an exploded perspective view showing a primary air/air heat exchanger constituting a component of the air dryer according to the present invention.

After this brief introduction to the function of the air dryer, reference is again made to FIG. 2. In FIG. 2, a schematic view of the primary heat exchanger 200 is shown. The hot, contaminated air enters the inlet 220, placed in a cover plate 230, and flows in paths as denoted by a dashed line 240 towards an opening 245. During the heat exchanger passage, the contaminated air will exchange heat with cold dry air entering the heat exchanger 200 at a secondary inlet 250. The origin of this cold dry air will be explained later.

The contaminated air exits the heat exchanger 200 and enters the pipe 200-300 (FIG. 1), which connects the primary heat exchanger 200 and the secondary heat exchanger 300.

Figure 3:
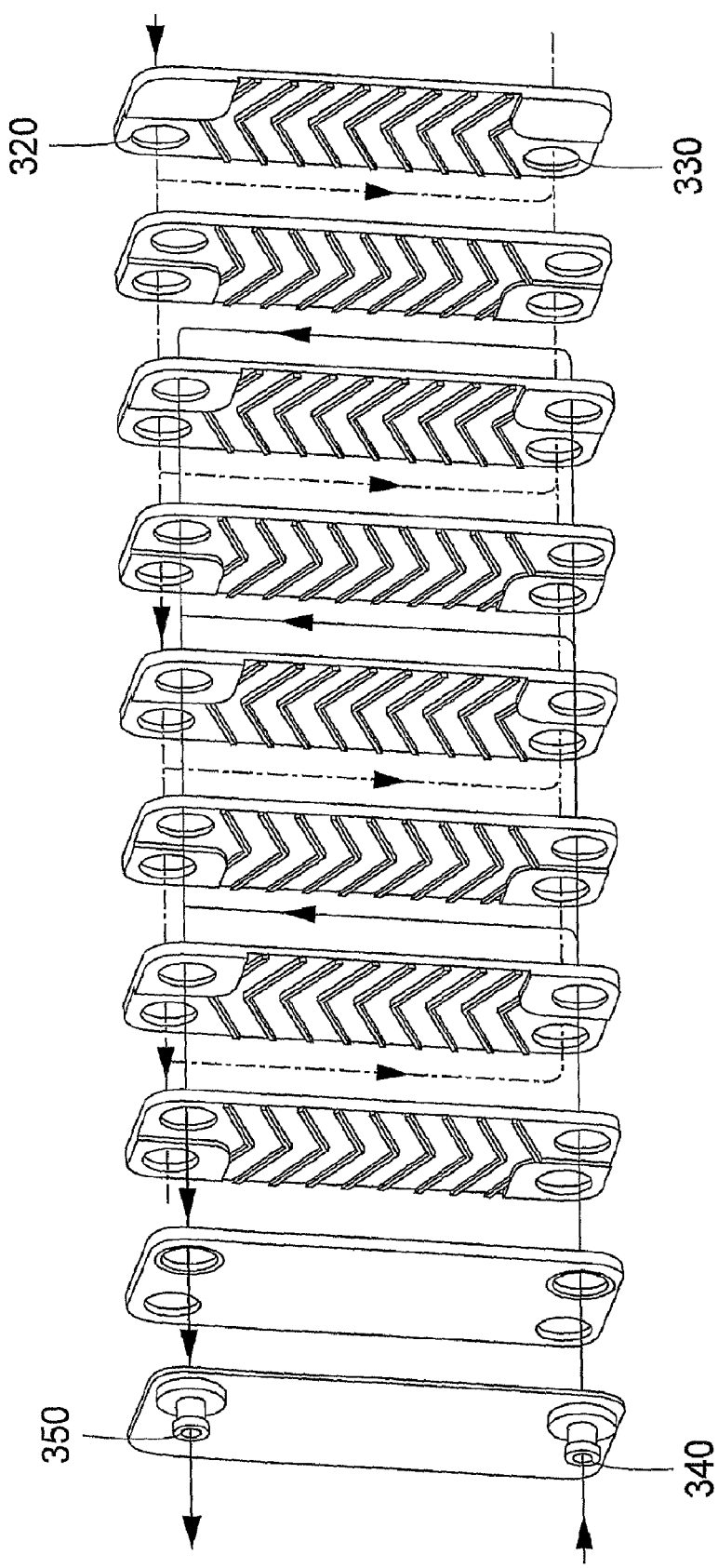
FIG. 3 is an exploded view showing a secondary refrigerant/air heat exchanger constituting a component of the air dryer according to the present invention.

In the secondary heat exchanger (FIG. 3), the incoming contaminated air will flow in a path as denoted by dash-dotted lines, from an inlet 320 to an outlet 330. Simultaneously, a refrigerant or other cold medium will enter the heat exchanger through a refrigerant inlet 340 and flow in a counterflow direction as compared to the contaminated air flow, towards a refrigerant outlet 350, as denoted by solid lines. The refrigerant is in some way connected to an external cooling source; for example, the refrigerant could be an HFC, ammonia, or a hydrocarbon, and the cooling source could be a compressor combined with an external condenser (not shown), or the like.

Figure 4:
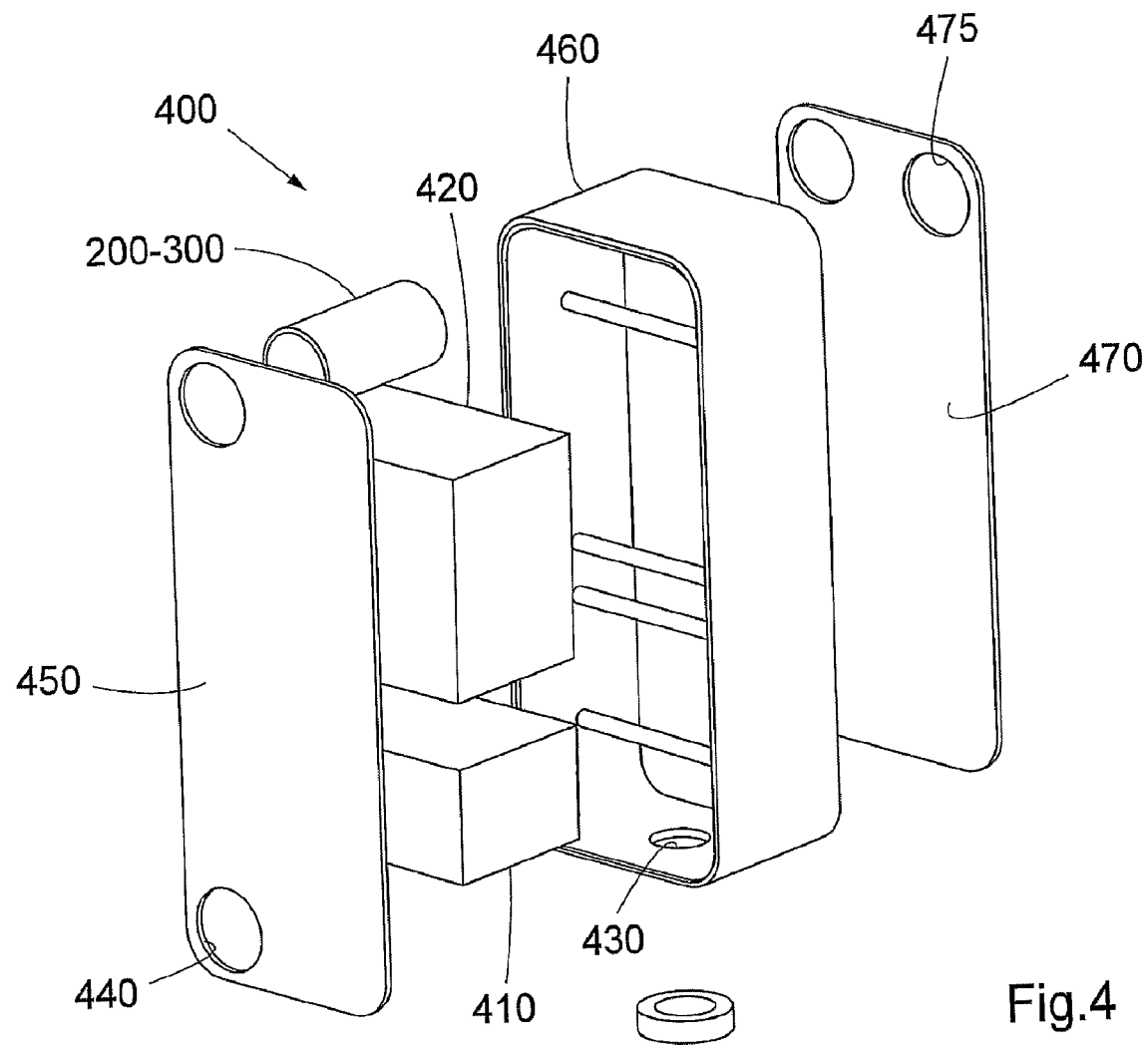
FIG. 4 is an exploded view showing an exemplary embodiment of a condense trap according to the present invention.

The now cold contaminated air will exit the secondary heat exchanger through the outlet 330, and enter a lower portion of the condense trap 400 (FIG. 4) through an opening 440 in a first side plate 450, as is shown in FIG. 4. Inside the condense trap 400, the opening 440 opens into an empty space defined by a bottom and two side walls of a condense trap housing 460, a side plate 470, the side plate 450 and the primary trapping medium 410. The primary trapping medium is attached to the inner surfaces of the condense trap 400 in such a way that no air is able to pass between the inner surfaces and the primary trapping medium 410.

Hence, all cold air will pass through the trapping medium 410. The function of the medium is to allow small condensed droplets to agglomerate into droplets large enough not to follow the air stream, and hence fall to the bottom of the housing 460, where the condensable matter will drain through the drainage hole 430.

After the primary trapping medium 410, the air will continue upwards to the secondary trapping medium 420, which is fastened to the internal surfaces the same way as the primary trapping medium 410. In the secondary medium, further condensable matter will agglomerate into droplets large enough to fall towards the bottom of the housing 460, and drain through the drainage hole 430.

The air will exit the condense trap 400 through an opening 475 and enter the primary heat exchanger 200 through the secondary inlet 250 (FIG. 2). Inside the primary heat exchanger, the cold air will follow a path denoted by the solid lines in FIG. 2, from the secondary inlet 250 to an outlet 260, and exchange heat with the incoming hot contaminated air.

The final heat exchange results in a temperature increase of the outgoing dry air; this decreases the risk of pipes leading from the air dryer to an air consumer getting covered with water condensed from the ambient air. Furthermore, the efficiency of the air dryer increases, since the temperature of the hot, contaminated air entering the secondary heat exchanger decreases, which means that a lower cooling power could be used in the secondary heat exchanger 300.

The air dryer according to the present invention is preferably brazed in one piece, according to a process that will be explained below:

In a first manufacturing step, a desired number of identical heat exchanger plates 210 are stacked onto one another to form the primary heat exchanger 200, wherein sheets of a brazing material are placed between the heat exchanger plates; during the stacking of the plates, it is crucial that every other plate is rotated 180 degrees compared to the neighbouring plates. This ensures proper pathways for the air to be heat exchanged, and is a method well known by persons skilled in the art of heat exchangers.

In a second manufacturing step, the side plates 450, 470, the housing 460, the trapping media 410, 420, and the pipe 200-300 of the condense trap 400 are stacked onto the heat exchanger plates 210. Where deemed necessary, intermediate sheets of brazing material should be placed between said components.

In a third manufacturing step, a desired number of identical heat exchanger plates 310 are stacked onto the aforementioned components of the condense trap 400 to form the secondary heat exchanger 300, in the same manner as the aforementioned heat exchanger plates 210 form the primary heat exchanger 200. Also here, sheets of brazing material are placed between the plates 310. During this step, it is crucial that the pipe 200-300 spans the gap between the primary and secondary heat exchangers 200 and 300 (actually the gap between the opening 320 and the opening 245).

In a last manufacturing step, the stacked components with intermediate sheets of brazing material are placed in an oven which is evacuated and heated. Alternatively, the oven could be filled with inert gas; this could be beneficial due to the fact that this would enable a faster manufacturing, since it would not be necessary to evacuate the brazing oven prior to the brazing. Due to the heat, the brazing material will braze the components together to form a single unit containing all necessary functions to condense condensable matter in a stream of pressurised air.

In the preferred embodiment, the condense trap is placed between the primary and secondary heat exchangers. This is beneficial due to the temperature difference between the primary and secondary heat exchangers; it is beneficial with heat transfer insulation between the primary and secondary heat exchangers, and the condense trap will to some degree serve as such an insulation.

As is obvious for a person skilled in the art, the description is only to be seen as an example of how the present invention could be exercised. For example, it is not necessary to have intermediate sheets of brazing material between the heat exchanger plates. Instead, a brazing paste, or even a glue could be used.

Dimensions

In a preferred embodiment of the invention, eight heat exchanger plates 310 are used to form the secondary heat exchanger 300 and eight heat exchanger plates 210 are used to form the primary heat exchanger 200. Preferably, the heat exchanger plates are about 70-120 mm wide and 190-290 mm high. The plate thickness is preferably 0.3-0.4 mm. A preferred material for the heat exchanger plates 210,310, the housing 460, the side plates 450, 470 and the trapping media 412, 420 is stainless steel, e.g. of the type referred to as AISI 304 or AISI 316.

The trapping media 410, 420 are preferably made from a stainless wire mesh, having a density of about 226 kg/m$^3$. In a preferred embodiment, the wire diameter of the trapping media 410, 420 is about 0.28 mm.

The invention claimed is:

1. A compact gas dryer comprising a primary heat exchanger for exchanging heat between hot incoming contaminated gaseous medium and outgoing dry cool gaseous medium, a secondary heat exchanger for exchanging heat between incoming cold gaseous medium from the primary heat exchanger and a refrigerant, and a condense trap trapping condensable matter in a cooled gaseous medium exiting the secondary heat exchanger, after which the dry cool gaseous medium exchanges heat with the incoming contaminated gaseous medium in the primary heat exchanger, wherein the primary heat exchanger, the secondary heat exchanger and the condense trap are combined into a single unit.

2. The compact gas dryer according to claim 1, wherein the single unit is brazed in one piece.

3. The compact gas dryer according to claim 1, wherein the condense trap is placed between the primary heat exchanger and the secondary heat exchanger.

4. The compact gas dryer according to claim 2, wherein brazing material utilized to braze the single unit is copper or nickel.

5. The compact gas dryer according to claim 1, wherein the primary heat exchanger and the secondary heat exchanger are manufactured from a number of identical heat exchanger plates.

6. The compact gas dryer according to claim 5, wherein the heat exchanger plates are made of stainless steel.

7. The compact gas dryer according to claim 2, wherein the condense trap is placed between the primary heat exchanger and the secondary heat exchanger.

8. The compact gas dryer according to claim 2, wherein the primary heat exchanger and the secondary heat exchanger are manufactured from a number of identical heat exchanger plates.

9. The compact gas dryer according to claim 3, wherein the primary heat exchanger and the secondary heat exchanger are manufactured from a number of identical heat exchanger plates.

* * * * *